United States Patent Office 2,792,105
Patented May 14, 1957

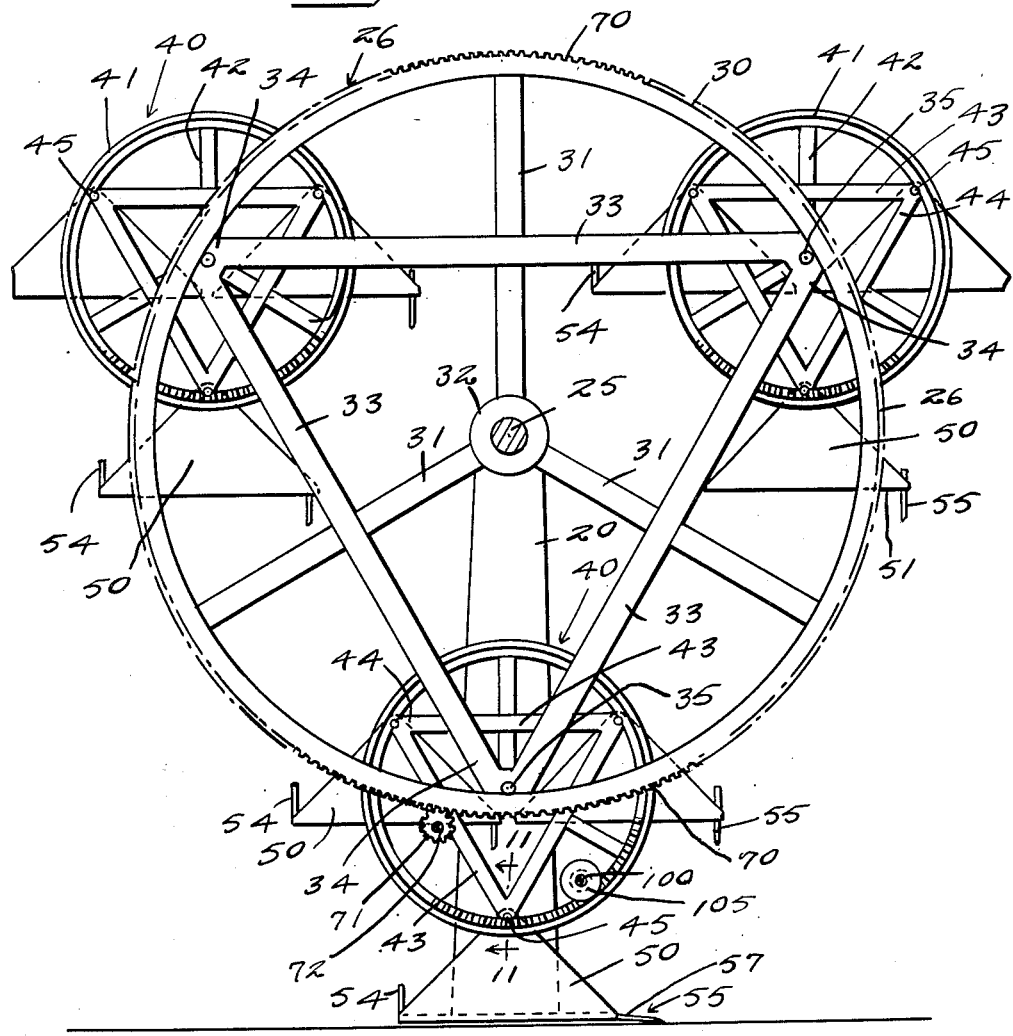

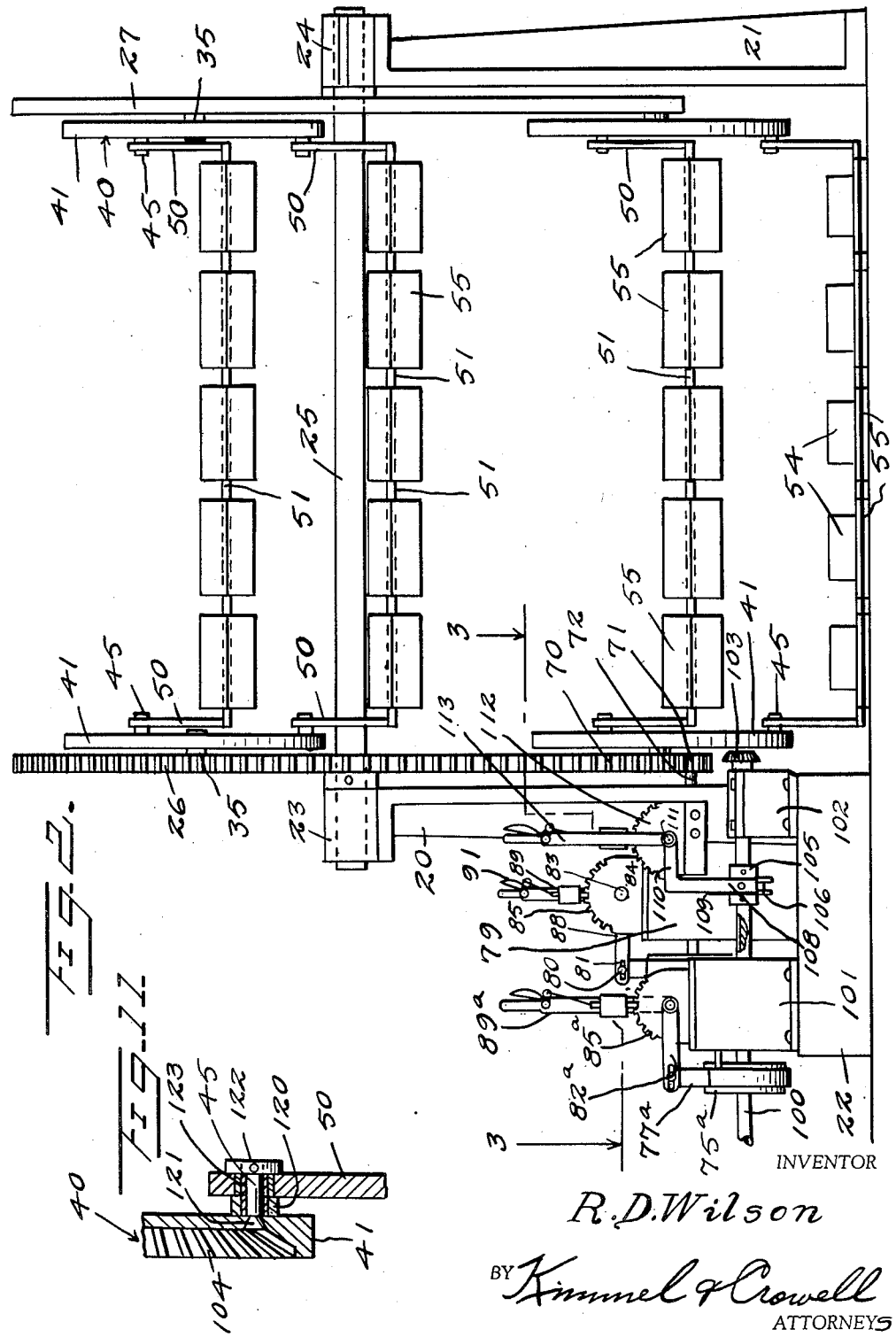

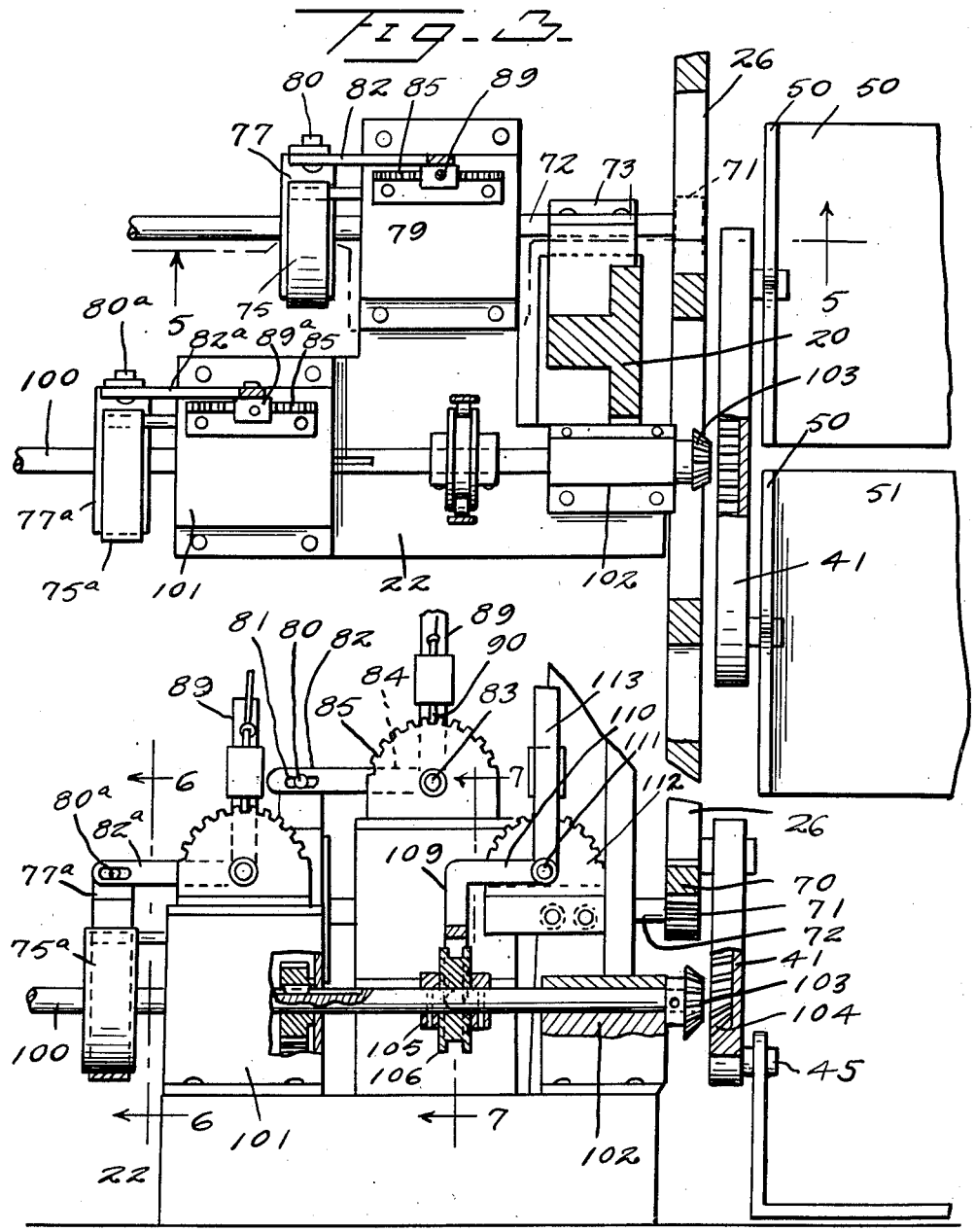

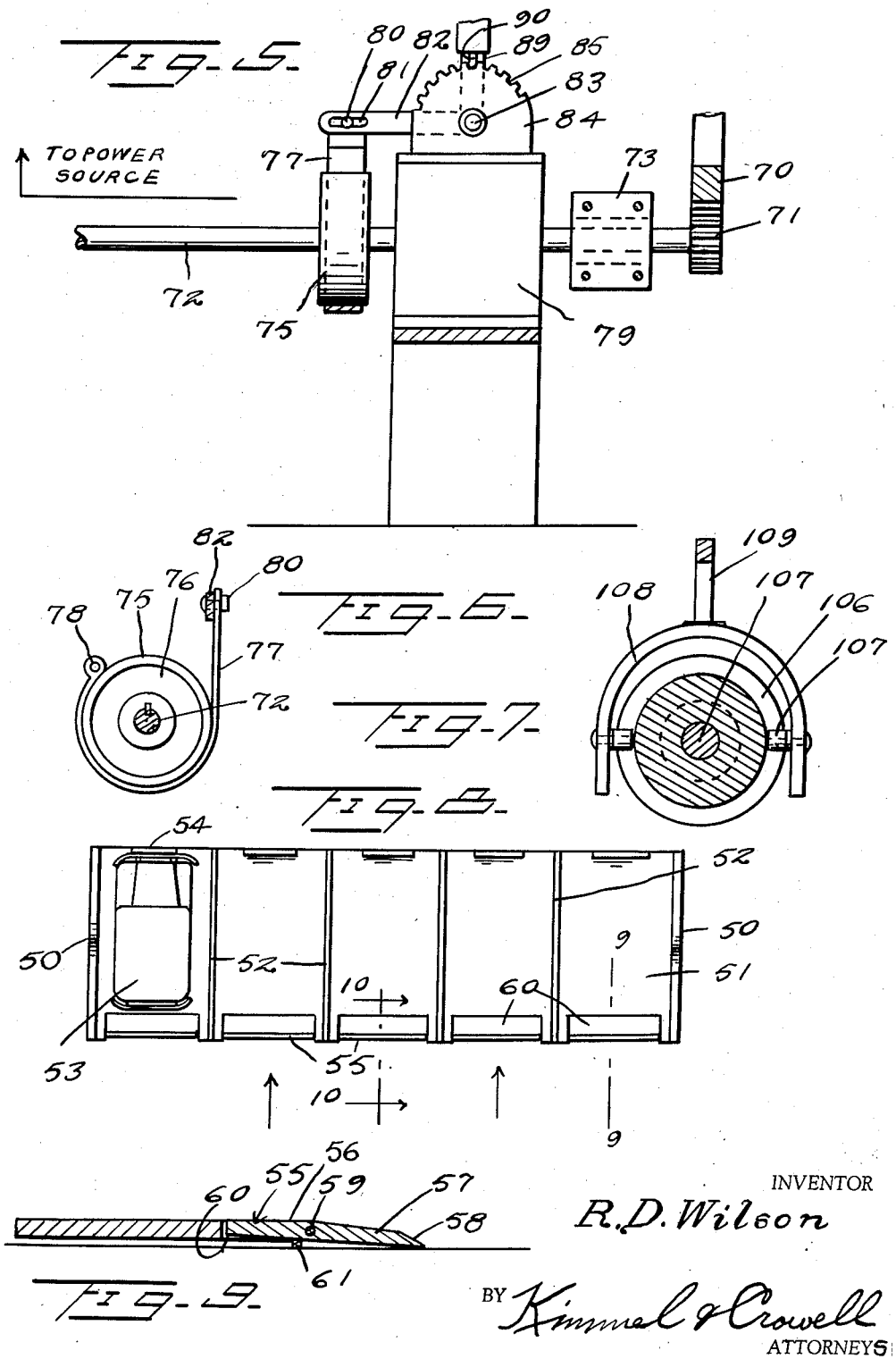

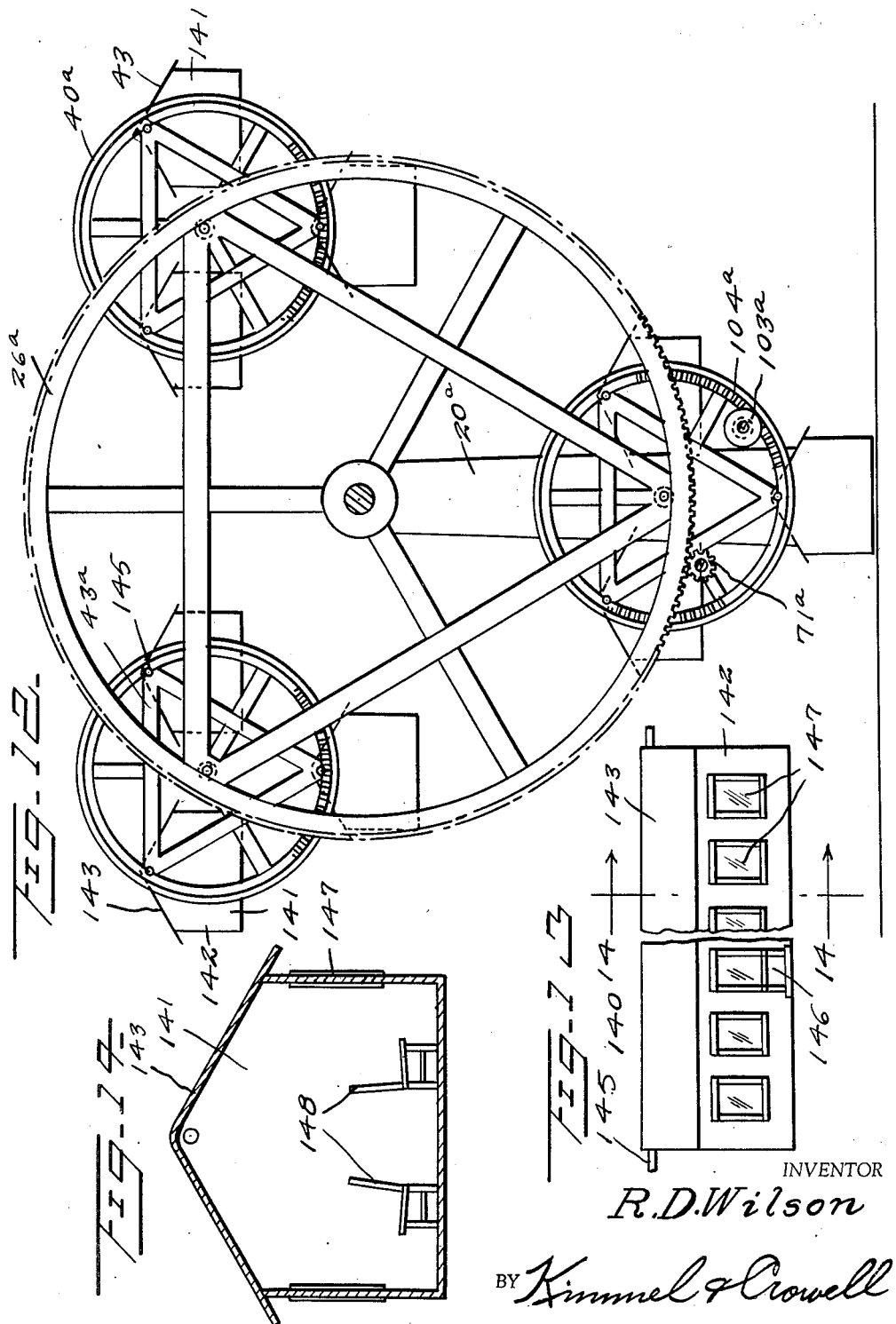

2,792,105

PLANETARY PARKING STRUCTURE

Reginald D. Wilson, Baltimore, Md.

Application July 26, 1954, Serial No. 445,578

2 Claims. (Cl. 198—211)

This invention relates to a planetary parking structure and has as its primary object the provision of an improved parking device whereby a relatively large number of cars may be parked in a relatively small space.

An additional object of the invention is the provision of a Ferris wheel like structure having a plurality of supplemental wheel like frames mounted thereon, each supplemental frame carrying a plurality of pivoted platforms upon which vehicles may be parked.

Still another object of the invention is the provision of such a device incorporating power means for rotating the main frame, and an additional power means for selectively rotating the supplemental frames.

A further object of the invention is the provision of improved pivoted stop means which preclude the movement of vehicles carried by the platforms.

A still further object of the invention is the provision of means whereby certain of the stop means are moved out of position when the platform is in its lowermost position and adjacent the ground level.

An additional object of the invention is the provision of brake means whereby the position of the platforms containing vehicles to be parked may be readily adjusted to balanced relation at a reduced rate of speed to preclude displacement of the vehicles.

Still another object of the invention is the provision of a parking device which will accommodate a large number of vehicles in a materially restricted surface area.

Still another object of this invention is the provision in a modified form of construction of a Ferris wheel arrangement embodying the main rotary frame and the supplemental frames but incorporating a housing and interiorly position seats on each platform.

Still other objects reside in the combination of elements, arrangement of parts, and features of construction all as will be more fully pointed out hereinafter and disclosed in the accompanying drawings wherein there is shown a preferred embodiment of this inventive concept.

In the drawings:

Figure 1 is a side elevational view, partially in section, disclosing one form of the device embodying features of the instant invention.

Figure 2 is a front plan view of the construction of Figure 1.

Figure 3 is an enlarged sectional view taken substantially along the line 3—3 of Figure 2, as viewed in the direction indicated by the arrows.

Figure 4 is a side elevational view, partially in section, of the structure disclosed in Figure 3.

Figure 5 is an enlarged fragmentary sectional view taken substantially along the line 5—5 of Figure 3.

Figure 6 is an enlarged sectional view taken substantially along the line 6—6 of Figure 4, as viewed in the direction indicated by the arrows.

Figure 7 is an enlarged sectional view taken substantially along the line 7—7 of Figure 4, as viewed in the direction indicated by the arrows.

Figure 8 is a top plan view of one of the vehicle carrying platforms.

Figure 9 is an enlarged sectional view taken substantially along the line 9—9 of Figure 8 with the barrier in down position.

Figure 10 is an enlarged sectional view taken substantially along the line 10—10 of Figure 8 with the barrier in up position.

Figure 11 is an enlarged sectional view taken substantially along the line 11—11 of Figure 1, as viewed in the direction indicated by the arrows.

Figure 12 is a side elevational view similar to Figure 1, but disclosing a modified form of construction.

Figure 13 is an end elevational view of one of the platforms and housing structure disclosed in Figure 12, parts thereof being broken away.

Figure 14 is an enlarged sectional view taken substantially along the line 14—14 of Figure 13, as viewed in the direction indicated by the arrows.

Similar reference characters refer to similar parts throughout the several views of the drawings.

Referring now to the drawings in detail, the device of the instant invention is comprised of a main supporting frame including a pair of oppositely disposed spaced uprights 20 and 21 mounted on a fixed base 22, and each provided at its upper extremity with journals 23 and 24, respectively.

Mounted for rotation in journals 23 and 24 is a transversely extending shaft or axle 25, which supports adjacent its ends a circular rotary frame, comprised of a pair of oppositely disposed wheel like members 26 and 27, respectively. Each of the wheel like members or frames 26 and 27 is comprised of a circular rim 30, connected as by spokes 31 to a central hub 32 surrounding the shaft or axle 25.

A triangular frame work comprised of cross chords 33 is also provided, the apices 34 of the triangle thus formed being situated mid-way between the juncture of the spokes 31 with the rim 30.

Extending inwardly from each apex 34 is a stub axle 35, each axle carrying a supplemental wheel 40 of materially lesser diameter than the main wheels 26 and 27. Each of wheels 40 is comprised of a rim 41, and spokes 42 communicating with a central hub similar to the hub 32.

A triangular arrangement comprised of chords 43 similar to the chords 33 is also provided, and each apex 44 of the triangle formed by the chords 43 is provided with a stub axle 45.

The stub axles 45 carried by opposite supplemental circular frames 40 each pivotally engage the apex of a triangular end plate 50 comprising the end portions of platform members, including flat bases 51 extending in parallel rotation between the triangular end plates 50.

The arrangement is such that the main rotary circular frame has mounted thereon three equidistantly spaced supplemental circular frames, and each of the supplemental frames contains between its opposite wheel like ends three platforms for the parking of vehicles or the like.

As best shown in Figure 8, each platform 51 is marked as by lines 52 in a plurality of equal stalls, each adapted for the reception of a vehicle 53. At one end of each stall there is positioned a fixed barrier 54, while at the other end of each stall there is positioned a movable barrier 55.

The movable barrier 55 comprises, as best shown in Figures 9 and 10, a normally upwardly extending portion 56 and a depending portion 57 having a tapered end 58 adapted to form a ramp. Each movable barrier 55 is mounted on a pivot 59 and is adapted, when the parts are in the position shown in the lowermost platform 51 in Figure 1, for abutting relation with the ground to seat in the slot 60 which is formed in each platform immediately rearwardly of the adjacent movable barrier 55.

A stop member 61 extends transversely across each slot and limits the movement of the movable barrier 55 in one direction to a vertical position. The rotation of the wheel is normally clockwise, as seen in Figure 1, and the consequent impact of the ground with the lower portion 57 of the barrier 55 will cause movement of the aligned barriers of a given platform to the position disclosed in Figure 9.

Means are provided for rotating the main circular frame comprised of wheels 26 and 27, and take the form of a plurality of teeth 70 extending about the periphery of one of the wheels, illustratively the wheel 26.

Teeth 70 are engaged, as best shown in Figures 1 and 4, by a spur gear 71, which is mounted on a drive shaft 72. The shaft 72 is adapted to be rotated by any desired source of power (not shown) and is journalled in a bracket 73 extending outwardly from support 20 of the main stationary frame.

A suitable brake member is provided for the control of shaft 72, and takes the form of a brake drum 75 (see Figures 5 and 6) keyed as by a key 76 to the shaft 72 and surrounded by a brake band 77 having one end fixed to a suitable pin 78 secured to a frame 79 carried by base 22.

The band 77 is fixed at its other end to a pin 80 which extends through a slot 81 in an arm 82 which is pivotally mounted on a shaft 83 journalled for rotation in frame or bracket 79.

A quadrant 84 provided with teeth 85 is positioned adjacent the shaft 83, and an operating lever 89 is formed integrally with the lever 82 and includes a movable lug 90 adapted to be retracted by movement of a spring biased handle 91 to permit rotation of the brake lever 89 to tighten or loosen the associated band 77.

Means are also provided for rotating the supplemental wheeled frames 40 comprised of, and take the form of, a drive shaft 100 journalled in a supporting bracket 101, a second bracket 102 terminating in a beveled gear 103. Beveled gear 103 is adapted to engage an internally positioned ring gear 104 carried interiorly of the adjacent rim 41 of each supplemental circular frame. The shaft 100 is adapted to be rotated by any desired source of power not shown.

The beveled gear 103 is adapted to be moved into and out of engagement with ring gear 104 as by means of a clutch arrangement which, as best shown in Figures 2, 4, and 5, includes a collar 105 fixed to shaft 100 and having a pair of flanges 106 positioned thereon. The flanges 106 are engaged by pins 107 carried by a fork member 108 secured to an arm 109 which has a right angularly disposed portion 110 pivotally connected to a stub shaft 111 carried by a quadrant 112.

An operating lever 113 similar in all respects to the lever 89 is fixed to the arm 110, and movement of the operating arm 113 will thus obviously shift the shaft 100 forwardly or backwardly to engage or disengage beveled gear 103 with ring gear 104.

A brake assembly is also provided at the shaft 100 and includes a drum 75a, a brake band 77a, a pin 80a connected to a lever 82a operated through an operating lever 89a and a quadrant 85a. The arrangement is exactly similar to that previously disclosed in connection with the brake lever 89 and its associated assembly operating on shaft 72.

Figure 11 discloses a detail of the pivotal mounting of end plates 50 on stub axles 45. It is noted that a washer 120 is positioned between the inner rim of supplemental wheel 40, and that a stud having a peened head 121 extends through the rim of wheel 40 and terminates in an enlarged head 122. A bushing 123 surrounds axle 45 to permit free pivotal movement of the platform 51 associated with the end plate 50.

From the foregoing, the operation of the device should be readily understandable. When it is desired to park a vehicle, one of the platforms 51 is positioned adjacent the ground and is shown in lowermost position in Figure 1. When this platform is full the sub-assembly 40 containing this platform is rotated until the next platform assumes the lowermost position, the brake mechanism operated by the lever 89 serving to hold the assembly in position.

After filling the second platform the third platform may be filled and the main circular frame assembly comprised of wheels 26 and 27 rotated until the next supplemental wheel assembly and its associated platform are in position for loading.

Since the increased weight on the first supplemental wheel assembly will serve to unbalance the main wheel assembly, the brake assembly operated by the lever 89 is employed to hold the assembly in proper position when the power supplied through drive shaft 72 is removed.

Obviously when the platforms are loaded the device will be in substantially balanced relation, and only slight brake pressure need be employed.

In order to reduce the power required to move the device, if desired, the unit may be loaded with one car to a platform at a time so that it remains substantially in balance at all times.

Having reference now to the modified form of construction disclosed in Figures 12, 13, and 14, there is shown a main stationary frame including uprights 20a, a main rotary frame 26a, and a plurality of sub-assembly or supplemental wheeled frames 40a, the drive mechanism including spur gear 71a, ring gear 104a, and beveled gear 103a, and is substantially identical in all respects to the modification previously disclosed.

In this construction, however, the end plates 50 and the platform 51 are omitted, and a housing structure 140 including end plates 141, side walls 142, and a roof 143, is substituted therefor.

In this modification, which is adapted to be employed as a Ferris wheel, there is obviously no necessity for the stops previously referred to. Stub axles 145 extend from the apices of the end plates 141 to the points on the rim of each supplemental wheel assembly 40a at the apices of chord members 43a which are arranged in triangular form as previously described in connection with the members 43.

The houses or housing 140 are each provided with an entrance door 146, a plurality of observation windows 147, and carry in the interior thereof a suitable number of seats 148 for the accommodation of passengers.

In this construction the device is obviously used as a Ferris wheel and the drive mechanism is substantially identical to that previously disclosed, however, in this arrangement the wheels are kept constantly rotating until it is desired to load or unload one of the housings 140 rather than moved step-by-step as in the previous modification.

From the foregoing it will now be seen that there is herein provided an improved planetary device particularly adapted for parking vehicles but which may be alternately modified for use as a Ferris wheel, which reduces the parking space for a specified number of cars to a minimum, which may be readily adjusted to a loading and unloading position, and which accomplishes all the objects of this invention, and others, including any advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. In a planetary device, a stationary main frame, a circular frame rotatably mounted in said main frame, means for rotating said circular frame, a plurality of supplemental circular frames equidistantly and rotatably mounted about said first-mentioned circular frame, means for rotating said supplemental circular frames, a plurality of supporting platforms equidistantly mounted about each of said supplemental frames, said means for rotating said supplemental frames comprising an internal ring gear, a bevel gear selectively engageable with said internal ring gear, said bevel gear being mounted for rotation on a fixed ground supported base, and power means for driving said bevel gear.

2. In a planetary device, stationary main frame, a circular frame rotatably mounted in said main frame, means for rotating said circular frame, a plurality of supplemental circular frames equidistantly and rotatably mounted about said first-mentioned circular frame, means for rotating said supplemental circular frames, a plurality of supporting platforms equidistantly mounted about each of said supplemental frames, said means for rotating said first-mentioned frame including an external gear extending peripherally about said first-mentioned frame, a spur gear in mesh with said circular gear, a drive shaft carrying said circular gear, power means for driving said shaft, said means for rotating said supplemental frames comprising an internal ring gear for each of said frames, a bevel gear selectively engageable with any of said internal ring gears, said bevel gear being mounted for rotation on a fixed ground supported base and power means for driving said bevel gear.

References Cited in the file of this patent
UNITED STATES PATENTS

| | | |
|---|---|---|
| 853,155 | Boardman | May 7, 1907 |
| 1,619,966 | Blackham et al. | Mar. 8, 1927 |
| 1,936,107 | Cunneen | Nov. 21, 1933 |
| 2,245,417 | Schlarmann | June 10, 1941 |
| 2,689,658 | Youell | Sept. 21, 1954 |